Figure 1:
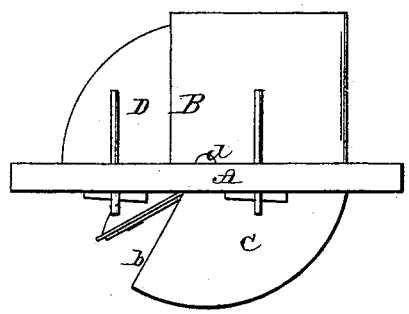
Figure 2:
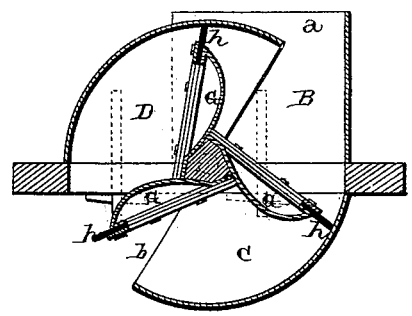

H. H. PARRY.
SEWER STENCH-TRAP.

No. 181,711.             Patented Aug. 29, 1876.

WITNESSES:             INVENTOR:

UNITED STATES PATENT OFFICE.

HARVEY H. PARRY, OF COLUMBUS, OHIO.

IMPROVEMENT IN SEWER STENCH-TRAPS.

Specification forming part of Letters Patent No. 181,711, dated August 29, 1876; application filed July 3, 1876.

*To all whom it may concern:*

Be it known that I, HARVEY H. PARRY, of Columbus, in the county of Franklin and State of Ohio, have invented certain new and useful Improvements in Sewer Stench-Traps; and I do hereby declare the following to be a full, clear, and exact description of the invention, such as will enable others skilled in the art to which it pertains to make and use it, reference being had to the accompanying drawings, which form part of this specification.

The nature of my invention consists in the construction and arrangement of a sewer stench-trap, as will be hereinafter more fully set forth.

In the annexed drawing, which fully illustrates my invention, A represents the frame, to be made of cast-iron, with curb B on top, made either of brick, stone, or wood.

Underneath the frame A, on the same side as the curb B, is a guard or casing, C, of segmental form, and a similar segmental guard or casing, D, is secured on top of the frame A, on the opposite side from the curb, leaving an opening, a, between the curb and the upper edge of the guard D, for the admission of the water into the trap. b is the outlet of the trap at the edge of the guard C. d is a shaft, having its bearings in the frame A, and provided with three or more buckets, G, attached thereto radially at equal distances apart.

These buckets are made of such size that when the shaft revolves they will fit in the guards or casing, and along the edges of the buckets are fastened rubber strips $h\ h$, so as to make air-tight joints with said guards.

As the water strikes one bucket, G, in entering the trap at $a$, the other two buckets form air-tight joints with the two guards or casings, preventing the escape of any gas or stench. The weight of the water on the first bucket rotates the shaft, and as the third bucket leaves the casing C, the first bucket enters the same. Then, as the first bucket leaves the casing C and discharges the water at $b$, the third bucket has just entered the casing D, and the second bucket has left the same and receives the water at $a$.

It will thus be seen that at no time can any gases or stench escape from the sewer. This trap is simple in construction, can be manufactured cheaply, and is not liable to get out of order.

Having thus fully described my invention, what I claim as new, and desire to secure by Letters Patent, is—

1. In a sewer-trap, a horizontal shaft with three or more radial buckets attached thereto, and segmental guards or casings for said buckets to work in, when rotated by the water passing into the trap, substantially as set forth.

2. The combination of the frame A, segmental casings C D, horizontal rotating shaft $d$, and buckets G G, provided with elastic strips $h$, all constructed substantially as and for the purposes herein set forth.

In testimony that I claim the foregoing I have hereunto set my hand this 28th day of June, 1876.

HARVEY HARRIS PARRY.

Witnesses:
WM. M. TAYLOR,
DAVID K. WATSON.